United States Patent
Bauhahn

(10) Patent No.: US 6,683,560 B2
(45) Date of Patent: *Jan. 27, 2004

(54) SYSTEM AND TECHNIQUE FOR ENHANCED RADAR OBJECT DETECTION

(75) Inventor: Paul E. Bauhahn, Fridley, MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 123 days.

(21) Appl. No.: 09/751,832

(22) Filed: Dec. 29, 2000

(65) Prior Publication Data

US 2002/0084930 A1 Jul. 4, 2002

(51) Int. Cl.$^7$ .............................. G01S 7/40; G01S 7/497
(52) U.S. Cl. ........................ 342/173; 342/165; 342/70; 367/13
(58) Field of Search ........................ 342/70, 165, 173; 367/13; 73/290 V, 290 R, 173

(56) References Cited

U.S. PATENT DOCUMENTS

| | | | |
|---|---|---|---|
| 3,781,879 A | 12/1973 | Staras et al. | 343/5 R |
| 3,786,509 A | 1/1974 | Applebaum et al. | 343/17.1 |
| 3,859,620 A * | 1/1975 | Percy | 367/13 |
| 3,942,150 A * | 3/1976 | Booth et al. | 367/8 |
| 4,003,049 A | 1/1977 | Sterzer et al. | 343/6 R |
| 4,016,529 A | 4/1977 | Inuzuka et al. | 340/1 R |
| 4,150,375 A | 4/1979 | Ross et al. | 343/7 VM |
| 4,165,511 A | 8/1979 | Wocher et al. | 343/7 VM |
| 4,381,508 A | 4/1983 | Durboraw, III | 343/100 LE |
| 5,287,114 A | 2/1994 | Desodt et al. | 342/91 |
| 5,319,611 A | 6/1994 | Korba | 367/98 |
| 5,325,096 A | 6/1994 | Pakett | 342/70 |
| 5,334,969 A | 8/1994 | Abe et al. | 340/426 |
| 5,341,808 A | 8/1994 | Rickey | |
| 5,347,273 A | 9/1994 | Katiraie | 340/903 |
| 5,668,739 A | 9/1997 | League | |
| 5,712,640 A | 1/1998 | Andou et al. | 342/70 |
| 5,712,828 A * | 1/1998 | Luscombe et al. | 367/13 |
| 6,075,479 A | 6/2000 | Kudoh | 342/70 |
| 6,085,589 A * | 7/2000 | Cruickshank | 73/290 R |
| 6,087,976 A | 7/2000 | Reed et al. | 342/70 |
| 6,121,916 A | 9/2000 | McDade | 342/70 |
| 6,369,749 B1 | 4/2002 | Frey | |
| 6,407,696 B1 | 6/2002 | Neben | |

FOREIGN PATENT DOCUMENTS

| | | |
|---|---|---|
| DE | 19652441 A | 6/1998 |
| EP | 0782008 A | 7/1997 |
| GB | 2168562 A | 6/1986 |

* cited by examiner

Primary Examiner—Ian J. Lobo

(57) ABSTRACT

A object detection system, such as a radar, and a method for improving the useful information provided thereby. The system is mounted on a vehicle for providing contact information to the vehicle operator. The method includes recording a baseline noise signal in a contact-free environment. When the system is later used in an operating environment, those returns which fall beyond the ranges of the baseline signal in any given direction, are excluded from the output of the object detection system.

37 Claims, 2 Drawing Sheets

| RANGE | SIGNAL AMPLITUDE | RECORDED THRESHOLD | CLASSIFICATION |
|---|---|---|---|
| 0-0.5m | 1 | 3 | NOISE |
| 0.5-1m | 2 | 3 | NOISE |
| 1-1.5m | 8 | 2 | CONTACT |
| 1.5-2m | 7 | 2 | CONTACT |
| 2-2.5m | 1 | 1 | NOISE |
| 2.5-3m | 1 | 1 | NOISE |
| 3-6m | 0 | 1 | NOISE |
| 6-9m | 0 | 0 | NOISE |
| 9-12m | 0 | 0 | NOISE |
| 12m- | 0 | 0 | NOISE |

SYSTEM AND TECHNIQUE FOR ENHANCED RADAR OBJECT DETECTION

BACKGROUND OF THE INVENTION

The present invention pertains generally to a vehicle-mounted object detection system and a technique for improving the information obtained from the system.

Many radar (radio detection and ranging) systems are relatively inexpensive and are feasible for mounting on personal vehicles, such as automobiles, without prohibitively increasing the price of the vehicle. For example, inexpensive radar systems are mounted on the side mirrors of some cars and are used to illuminate the vehicles' blind spots. Other systems under development use ultrasound or optics to accomplish the same goal. Radar, however, is preferable as it is much less affected by adverse weather conditions.

One problem that arises with these detection systems pertains to receiving return signals from objects that do not need to be brought to the driver's attention. Such objects include the road, the bumpers of the vehicle, and any other objects that are predictably present and pose no threat to the safe navigation and operation of the vehicle. The radar return from such objects degrades the ability of the system to bring dangerous objects to the attention of the driver by creating clutter on a visual display or noise on an audible feedback system. This clutter can be collectively referred to as "noise".

Efforts have been made to filter unwanted information from vehicular object detection systems. For instance, some systems use Doppler to distinguish between useful information and unwanted information. Objects with high Doppler shifts are typically passing by the vehicle quickly, such as those which are stationary relative to the ground. Objects such as other cars positioned in a blind spot exhibit little to no Doppler shift and are, therefore not detected by such systems. These objects are naturally designated as useful information to the driver. Objects having a relatively uniform surface, such as the ground, a curb, a divider or objects protruding from the vehicle carrying the radar system, also return a low Doppler shift by virtue of their smooth, continuous surfaces. Doppler-related filters, therefore, fail to exclude all unwanted information.

Other efforts pertain to excluding false return signals which are generated by radar systems mounted on other vehicles. These can be considered false returns because they are not actually "returned" signals. These efforts do not address the problem of real return signals that bounce off of objects which do not need to be brought to the driver's attention.

It would be advantageous to provide a method for communicating useful radar return signals to the driver of a vehicle without also communicating radar return signals pertaining to objects which do not need to be brought to the driver's attention.

It would also be advantageous to provide a method of updating the criteria of which signals constitute useful information and which signals can be categorized as noise.

SUMMARY OF THE INVENTION

The present invention, therefore, relates to a system and technique or method for reducing undesirable return signals from the output of an object detection system. The technique generally comprises providing an object detection system having an output, placing the detection system in an environment free of contacts, recording a baseline noise signal, placing the system in an operating environment, and deleting any signal matching the recorded baseline from the output.

Providing an object detection system is preferably accomplished by providing a vehicular mounted radar system. It is envisioned, however, that the methods of the present invention could be embodied to apply to visual or optical detection systems, such as infrared, or acoustic detection systems such as ultrasonic detection systems. The output of the object detection system is preferably visual or audial, such as a display screen, and audible alarm or tone, or both. In the case of an audio output, the audible tones produced by the system would correspond to return signals and would preferably sound when either a turn signal in the direction of the object is activated, or when the steering wheel of the vehicle is turned toward the detected object. It is also preferable to establish a minimum amplitude threshold for a given range above which an object would cause an alarm regardless of the status of the turn signals or steering wheel of the vehicle carrying the system.

Placing the object detection system in an area free of contacts can be accomplished in a factory setting or on the road by the operator of the vehicle. Placing the object detection system in a factory setting preferably includes mounting the detection system on the intended vehicle or a similar model, and providing a flat floor suitable for simulating a road. More preferably, the area free of contacts is any given road on which the vehicle carrying the system happens to be travelling, at a time when there are no contacts within operable range of the object detection system. Insofar as the range of most object detection systems is relatively short, most roadways will be free from contacts periodically. Preferably, the system is constructed and arranged so that the driver of the vehicle carrying the object detection may initiate recording a baseline signal by pressing a button or similar action. Alternatively, it is envisioned that a baseline signal may automatically be recorded whenever the object detection system perceives the absence of contacts fitting a predetermined criteria for a period of time.

Once the object detection system is in an appropriate area free from contacts, a baseline noise signal is recorded. The baseline noise signal includes any returns the system receives on its emitted pulses. Because only signals reflected from contacts are desired, all other reflected signals can be considered noise. The noise signal may be recorded on an instant basis as a "snapshot" or, preferably, recorded over a predetermined period of time and averaged. This is especially advantageous when the recording is being conducted on an actual road as there are predictably more anomalies on a road than in a factory setting.

After a suitable baseline noise signal is recorded, the object detection system is ready to be used in an actual setting. It is thus placed in an operating environment. In the preferred embodiment where the baseline signal is an actual road during a period of time where there are no contacts present, the operating environment will be the same as the recorded environment, except that contacts may or may not be present. This embodiment is preferable because the baseline noise signal will more accurately represent the noise signal of the operating environment.

While in the operating environment, the signals received by the object detection which matches the baseline noise signal are not included in the output. An object detection system having a visual display would, therefore, display only those return signals that do not match, or are stronger than, the baseline signal. Similarly, an object detection system having an audio output would be prevented from emitting audible tones corresponding to those return signals that match, or are weaker than, the baseline noise signal.

In order to exclude those signals weaker than or matching the baseline noise signature, the computer or microchip of the radar system is programmed to require a stronger return for a given range than that of the baseline signal. "Ignoring" the baseline signal results in a radar system that presents a cleaner signal, showing only those things that are "different" than the baseline signal. It is conceivable that this method could also be used to enhance the output of the ultrasonic and optical systems as well. It is also conceivable that this technique may have applications other than on vehicles, such as a stationary proximity sensor which provides a warning when an object gets too close to the sensor.

It is thus an object of the invention to provide a method for communicating useful radar return signals to the driver of a vehicle without also communicating radar return signals pertaining to objects which do not need to be brought to the driver's attention.

It is also an object of the invention to provide a method of updating the criteria of which signals constitute useful information and which signals can be categorized as noise.

These and further objects and advantages of the present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All Figures are drawn for ease of explanation of the basic teachings of the preferred embodiments only. The extensions of the Figures with respect to number, position, relationship, and dimensions of the parts to form the preferred embodiments will be explained or will be within the skill of the art after the following description has been read and understood. Further, the exact dimensional proportions to conform to the specific force, weight, strength, and similar requirements will likewise be within the skill of the art after the following description has been read and understood.

DETAILED DESCRIPTION OF PREFERRED EMBODIMENTS

Figure 1:
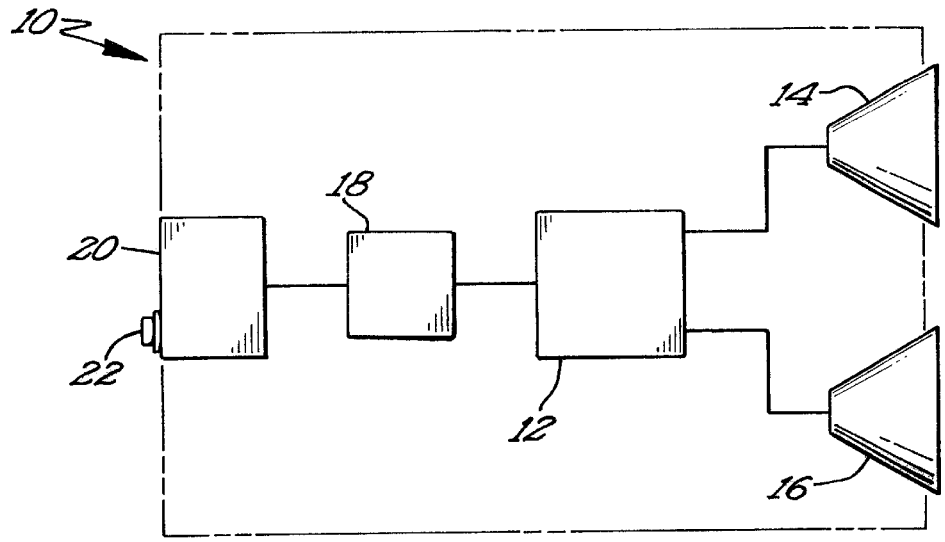
FIG. 1 is a diagrammatic representation of an object detection system of the present invention.

Referring now to the Figures, and first to FIG. 1, there is shown a schematic diagram of an object detection system 10 of the present invention. The object detection system 10 may include commercially available components programmed to perform the technique taught herein. The system 10 has a signal processor 12 operably connected with a transmitter 14, a receiver 16, and a computer or microprocessor 18. The signal processor 12 receives commands from the microprocessor 18 and converts them into the appropriate electrical signals which are then sent to the transmitter 14. Further, the signal processor 12 receives signals from the receiver 16 and converts them into a form readable by the computer 18. The computer 18 compares the signals received by the signal processor 12 to a stored array built from a recorded signal and sends the useful information to an output device 20. It is envisioned to provide a button 22, usable by an operator to place the computer 18 in a recording mode. While the button 22 is depressed, the computer 18 records the signals it receives from the signal processor 12 and creates an array 100, as described below.

Preferably, the output device 20 is a visual display or an audible tone or alarm. More preferably, the output 20 comprises both a visual display and an audible signal. It is envisioned that such a system include a visual display and a variable, user-selected, range alarm, giving the vehicle operator the ability to set a threshold above which an alarm will sound for a given range. It is also envisioned that a visual display provide constant contact information, and that an alarm sound when a turn signal is activated in the direction of a contact or when the steering wheel of the vehicle is turned in the direction of a contact.

Figure 2:
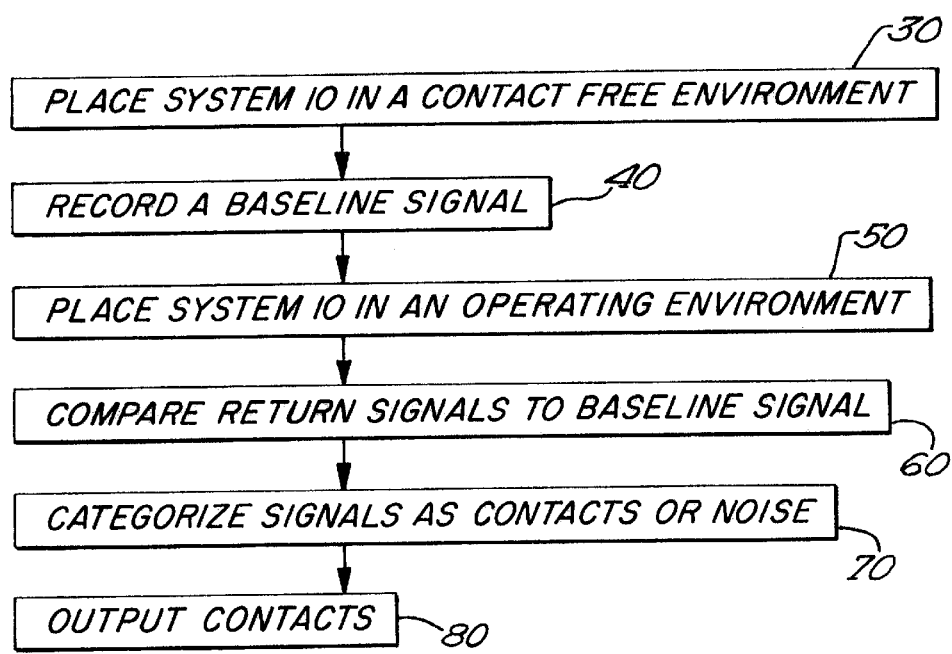
FIG. 2 is a flowchart of a preferred embodiment of the method of the present invention.

Referring now to FIG. 2, there is shown a flowchart of a preferred method of operation for the present invention. The method begins at 30 by placing the object detection system 10 in a contact-free environment at 30. "Contact", as used herein, is a term used to describe an object, capable of being detected by an object detection system, the existence of which represents valuable information to the operator of a vehicle and, therefore, should be brought to the operator's attention. A contact-free environment, then, would be any environment, such as a factory or a roadway, where other vehicles or similar objects are not present within the operable range of the object detection system.

Figures 3, 4:
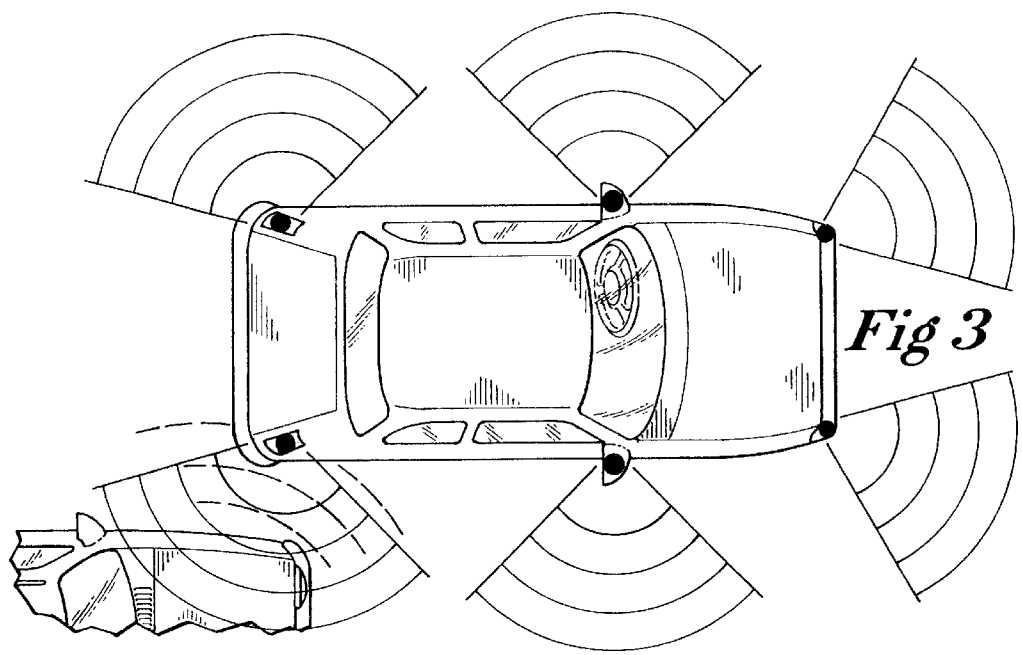
FIG. 3 is a perspective diagrammatic representation of the physical relationships between an object detection system and a contact as applicable to the method of the present invention; and, FIG. 4 is an example of an array used in a preferred embodiment of the method of the present invention to compare actual signals against a baseline noise signal.

Once the object detection system is placed in a contact-free environment, an initial baseline noise signal can be recorded at 40. Recording a baseline noise signal generally comprises noting the amplitudes and ranges of all returns received in the contact-free environment. A preferred embodiment utilizes this recorded information to assign a threshold amplitude value for any given range. These threshold values, then, represent the threshold level above which a future return must register in order to be classified as a contact. Stated alternatively, the threshold values can easily be subtracted from the actual signals to easily determine if a contact exists. If positive results are obtained from this subtraction operation, the threshold has been exceeded, thus indicating that information should be communicated to the vehicle operator. In order to provide directional information, multiple detectors may be used, positioned around the host vehicle. This is depicted in FIG. 3. By using multiple detectors, the hardware and software used to control the detectors remains simple and inexpensive.

An example of a baseline array 100 is shown in FIG. 4. It can be seen that for various ranges, the amplitude of a recorded baseline signal is noted and represents a threshold. The amplitude column is an example of possible signals detected by the system in actual use. If the value (which is shown as an assignment of a value between 0 and 10, proportional to the amplitude of the received signal) in the amplitude column is greater than the recorded threshold for any given range, the signal is classified as a "contact" and will appear or otherwise be conveyed to the operator by the system 10. If the value in the amplitude column is equal to or less than the recorded threshold, the signal will be classified as "noise" and will not be displayed or otherwise brought to the attention of the operator.

Using a factory, or similarly controlled contact-free environment, to record the baseline signal may provide certain advantages. For instance, such a controlled environment can be designed by a manufacturer to be representative of the noise returns that can be expected on a typical roadway. Moreover, for a given vehicle height and shape, the baseline signal can be recorded in the factory, and inputted into the detection systems being manufactured for a particular vehicle make. This embodiment would result in a lower unit cost for each detection system.

Alternatively, it may be advantageous to provide a system in which the baseline recording is accomplished on an actual roadway in response to an action initiated by the vehicle operator or in response to an automated function programmed into the system. This preferred embodiment allows a vehicle operator to update the recorded baseline noise signature to more closely match the surroundings in which the vehicle is travelling. Noise variations that may be detected in this embodiment, which may not be detected by the factory set embodiment described above, include traffic barriers, posts, fences, noise barriers, high curbs, cliffs, and other objects that may be found on the side of the road which do not need to be brought to the attention of the vehicle operator. Similarly, if the vehicle is towing a trailer, it may be desired to update the array 100 so that the trailer is not included in the output of the detection system. It is envisioned that if the operator is receiving an unacceptable number of signals attributable to such objects, the operator may depress a button or take a similar action which would set the object detection system into a record mode, thereby updating the noise array 100. Notably, a separate array 100 will be recorded and used for each detector of a given detection system of the present invention.

After the baseline noise signal is recorded at 40, the object detection system is placed in use on a vehicle in an operating environment at 50, which may or may not be the same environment as that in which the baseline noise signal was recorded. The return signals can then be analyzed by the object detection system at 70 and be classified as contacts or as noise depending on the signal amplitude and distance to the contact. For example, FIG. 2 depicts a signal returned from a vehicle alongside the vehicle carrying the object detection system. The signal can be roughly characterized by a range of about 1–1.5 meters and an amplitude of about 8 on a scale from 0 to 10. Return signals larger than the baseline signal at a given range are classified as a contact. Due to attenuation, the strength of the signal returned by an object will increase in strength as the object gets closer. Therefore, an object may be initially classified as noise but may be later attain contact status as the object gets closer to the host vehicle. At 80, all of the signals designated as contacts at 70 are conveyed to the vehicle operator by way of an output. A preferred output is a visual display showing the positions of the contacts relative to the vehicle carrying the system. This output will require multiple detectors, as shown in FIG. 3. Another preferred output is an audio alarm or tone which sounds when a contact is present or moves into range. A more preferred embodiment provides a combination of both outputs. A visual display screen gives a constant status of the relative positions of any contacts while an audio alarm sounds if a turn signal or the steering wheel is turned toward a contact.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method of enhancing useful return signals of an output of an object detection system mounted on a vehicle comprising:
   providing an object detection system, capable of detecting objects on the sides of the vehicle on which the system is mounted, and having an output;
   placing said object detection system in an environment free of contacts;
   recording a baseline noise signal generated by said object detection system in said environment free of contacts, said baseline noise signal representing returns off of non-contact objects surrounding said object detection system;
   placing said object detection system in an operating environment;
   deleting signals matching said recorded baseline noise signal from said object detection system output, thereby enhancing the useful return signals;
   determining a direction of expected movement of the vehicle; and
   providing an alarm in the event that useful return signals in the direction of expected movement have reached a predermined amount.

2. The method of claim 1 wherein providing an object detection system having an output comprises providing an object detection system having a visual display.

3. The method of claim 2 wherein deleting signals matching recorded baseline from said object detection system output comprises displaying only those return signals which do not match said baseline signal.

4. The method of claim 1 wherein providing an object detection system having an output comprises providing an object detection system which emits an audible tone which corresponds to return signals.

5. The method of claim 4 wherein deleting signals matching recorded baseline from said object detection system output comprises preventing said radar system from emitting an audible tone corresponding to those return signals which match said baseline signal.

6. The method of claim 1 wherein placing an object detection system in an environment free of contacts comprises placing said object detection system in an operating environment which is periodically free from contacts.

7. The method of claim 6 wherein recording a baseline noise signal comprises a driver initiated action.

8. The method of claim 7 wherein said driver initiated action comprises pressing a button.

9. The method of claim 6 wherein recording a baseline noise signal comprises an automated action triggered by the existence of a constant return signature over a predetermined period of time.

10. The method of claim 1 wherein placing an object detection system in an environment free of contacts comprises recording a baseline signal on a relatively flat surface, free from obstructions, in order to acquire a factory set return signature of the relatively flat surface and the vehicle.

11. The method of claim 1 wherein providing an object detection system comprises providing a radar system.

12. The method of claim 1 wherein providing an object detection system comprises providing an optical detection system.

13. The method of claim 12 wherein providing an optical detection system comprises providing an infrared detection system.

14. The method of claim 1 wherein providing an object detection system comprises providing an ultrasonic detection system.

15. A method of enhancing useful return signals of an output of an object detection system mounted on a vehicle comprising:
provi ding an object detection system, capable of detecting objects to the sides of a vehicle on which the system is mounted, having an output;
placing said object detection system in an environment free of contacts;
measuring signals generated by said object detection system and returned by predictably present objects, in said environment free of contacts, in order to define a baseline noise signal;
placing said object detection system in an operating environment;
providing an output representative of signals returned in said operating environment which are stronger than said baseline noise signal, thereby enhancing the useful return signals;
determining a direction of expected movement of the vehicle; and
providing an alarm in the event that useful return signals in the direction of expected movement have reached a predermined amount.

16. The method of claim 15 wherein providing an object detection system having an output comprises providing an object detection system having a visual display.

17. The method of claim 16 wherein providing an output representative of signals returned in said operating environment which are stronger than said baseline noise signal comprises providing an indication on said visual display of only those signals which have an amplitude component larger than the amplitude component of said baseline signal for a given range.

18. The method of claim 15 wherein providing an object detection system having an output comprises providing an object detection system which emits an audible tone which corresponds to a return signals detected on the side of the vehicle toward which a driver is turning, as indicated by either a turning of a steering wheel in the direction of said side, or operation of a turn signal corresponding to said direction.

19. The method of claim 18 wherein providing an output representative of signals returned in said operating environment which are stronger than said baseline noise signal comprises providing an audible tone corresponding to only those signals which have an amplitude component larger than the amplitude component of said baseline signal for a given range.

20. The method of claim 15 wherein placing an object detection system in an environment free of contacts comprises placing said object detection system in an operating environment which is periodically free from contacts.

21. The method of claim 20 wherein recording a baseline noise signal comprises a driver initiated action.

22. The method of claim 21 wherein said driver initiated action comprises pressing a button.

23. The method of claim 20 wherein recording a baseline noise signal comprises an automated action triggered by the existence of a constant return signature over a predetermined period.

24. An object detection system mountable on a vehicle comprising:
a signal processor;
a plurality of transmitters, constructed and arranged for operation to the sides of the vehicle, and operably attached to said signal processor;
a plurality of receivers, each associated with one of said transmitters, and operably attached to said signal processor;
an output device operably attached to said signal processor;
a computer operably attached to said signal processor and programmed to compare presently received operating signals from said receivers to a previously recorded signal generated by said transmitters and received by said receivers and allow only those attributes of said presently received operating signals from said receivers which differ from those of the previously recorded signals to be manipulated by said output device, wherein the computer further determines a direction of expected movement of the vehicle, and provides an alarm in the event that the differing attributes of the received operating signals in the direction of expected movement have reached a predermined amount.

25. The system of claim 24 wherein said transmitter comprises a radar transmitter.

26. The system of claim 24 wherein said output device comprises a visual display.

27. The system of claim 24 wherein said output device comprises an audio speaker.

28. The system of claim 24 wherein said output device is operably connected to a turn signal of the vehicle.

29. The system of claim 24 wherein said output device is operably connected to a steering wheel of the vehicle.

30. The system of claim 24 further comprising a record button which, when depressed, stores any signals received by said receiver in said computer for later comparison to said operating signal.

31. The system of claim 24 further comprising a plurality of transmitters and receivers operably attached to said signal processor.

32. An object detection system mountable on a vehicle comprising:
a signal processor;
a plurality of transmitters, constructed and arranged for operation to the sides of the vehicle, and operably attached to said signal processor;
a plurality of receivers, each associated with one of said transmitters, and operably attached to said signal processor;
an output device operably attached to said signal processor;
a computer operably attached to said signal processor and to a directional control on the vehicle, and programmed to compare presently received operating signals from said receivers to a recorded signal generated by said transmitters and received by said receivers, said computer programmed to cause said output device to alarm in the event that the directional control is operated in the same direction as a presently received operating signal from said receivers having attributes that differ from those of the recorded signals by a predetermined amount.

33. The object detection system of claim 32 wherein the computer is operably attached to a steering wheel.

34. The object detection system of claim 32 wherein the computer is operably attached to a turn signal.

35. The object detection system of claim 33 wherein said output device comprises a video display and an audible alarm and wherein said computer is programmed to display all presently received operating signals from said receiver having attributes that differ from those the recorded signals by a predetermined amount and to cause said audible alarm to sound in the event that the directional control is operated in the same direction as a presently received operating signal from said receivers having attributes that differ from those of the recorded signals by a predetermined amount.

36. The object detection system of claim 34 wherein said output device comprises a video display and an audible alarm and wherein said computer is programmed to display all presently received operating signals from said receiver having attributes that differ from those of the recorded signals by a predetermined amount and to cause said audible alarm to sound in the event that the directional control is operated in the same direction as a presently received operating signal from said receivers having attributes that differ from those of the recorded signals by a predetermined amount.

37. The object detection system of claim 32 further comprising a user-activated control, operably connected to said computer, and constructed and arranged such that, when operated, said control causes said computer to refresh said recorded signal by recording the presently received signal and using the refreshed recorded signal for comparison against subsequent presently received signals.

* * * * *